May 8, 1956    G. SEILER ET AL    2,744,588
BRAKE ACTUATOR

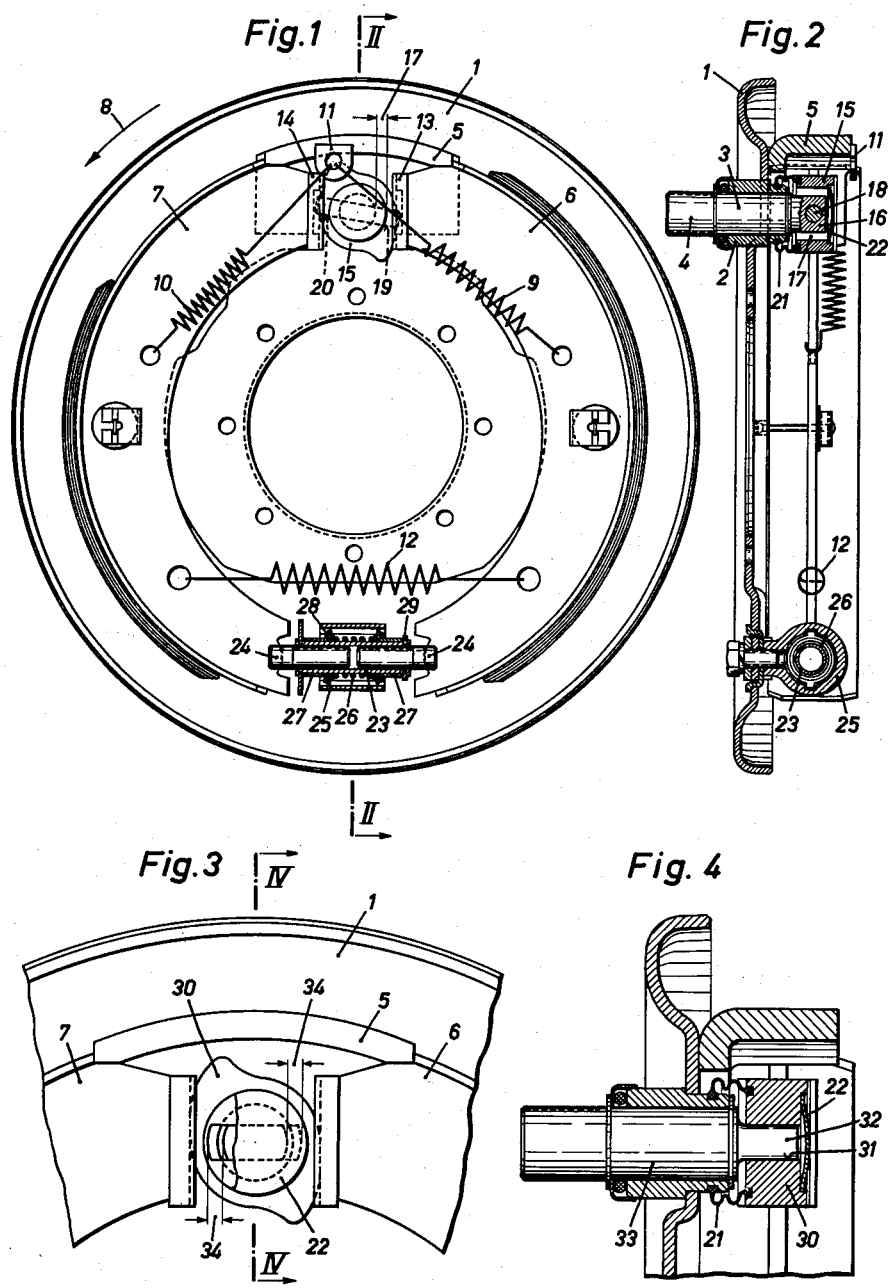

Filed May 21, 1952    2 Sheets-Sheet 2

Inventors
Georg SEILER and
Hans RUTZENHÖFER by *[signature]*
Attorney

United States Patent Office 2,744,588
Patented May 8, 1956

2,744,588
BRAKE ACTUATOR

Georg Seiler, Heidelberg, and Hans Rutzenhöfer, Mannheim-Friedrichsfeld, Germany, assignors to Deutsche Perrot-Bremse G. m. b. H., Mannheim-Friedrichsfeld, Germany Application May 21, 1952, Serial No. 289,022

Claims priority, application Germany November 26, 1951

6 Claims. (Cl. 188—78)

The invention relates to a two-shoe brake, in particular for motor vehicles, preferably having self-energizing internal brake shoes with a floating expanding member provided with two pressure transmitting arms arranged between their oppositely facing ends. It is the principal object of the invention to simplify the construction and improve the efficiency of such brakes.

According to an important feature of the invention the expanding member is radially guided on the brake shaft and is being engaged by engaging members of the brake shaft. This construction permits the expanding member to be guided on the brake shaft in a manner consuming very little energy and therefore results in very efficient braking. According to the invention it is thus also possible to provide accurately functioning centering devices between the other ends of the brake shoes which are suspended on springs. Such a centering device includes an adjusting nut supported axially displaceable in a housing mounted on the backing plate. When this adjusting nut is being moved to the one side or to the other it tensions a spring bearing against the housing, and this spring returns the adjusting nut to its central position after the brake is released.

Other important features of the invention will be apparent from the following description and the accompanying drawings, in which Fig. 1 is an inside view of a self-energizing internal expanding shoe brake;

Fig. 2 is a sectional view taken on line II—II of Fig. 1;

Fig. 3 shows part of the interior of a brake;

Fig. 4 is a sectional view taken on line IV—IV of Fig. 3;

Figure 5:
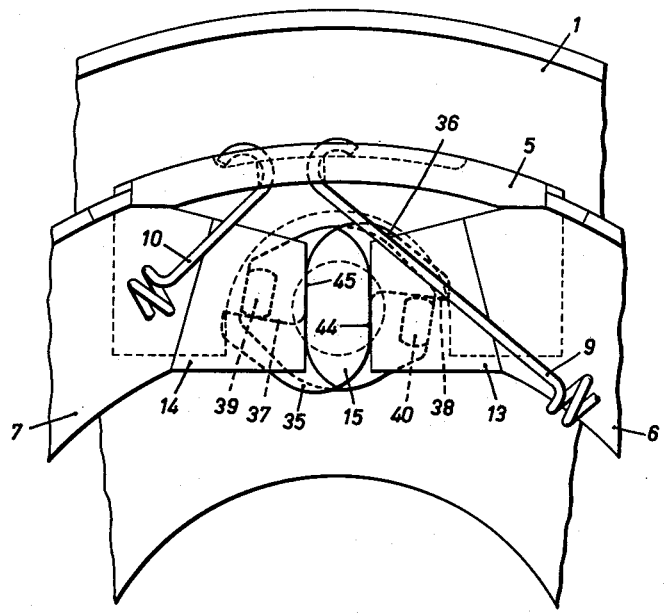
Fig. 5 shows an embodiment of the expanding mechanism according to the invention of an internal expanding shoe brake in the region of the brake shoe heads.

The backing plate 1 is provided with a fixed bearing 2 for the brake shaft 3, the outwardly projecting end 4 of which is serrated. On the side facing towards the brake the backing plate is provided in a manner known as such, with a fixed abutment 5 for two brake shoes 6 and 7, of which the first one is suspended by means of a strong spring 9 and the second one by means of a weaker spring 10 from a grommet 11 on the abutment 5, assuming a rotation of the brake drum in the direction indicated by arrow 8. The opposite parts of the brake shoes are further connected to each other in the usual manner by another spring 12.

Between the brake shoe heads 13 and 14 is mounted an expanding member 15 embracing the end 16 of brake shaft 3, which extends in the space between the brake shoes, with a certain amount of play 17. The end 16 has a transverse bore with a hardened pin 18 rigidly fixed therein and radially projecting therefrom on both sides. The expanding member 15 is provided with two bores 19, 20 into whcih the ends of pin 18 project with sliding engagement, permitting radially sliding displacement of the expanding member on said ends relative to the brake shaft. If the ends of pin 18 completely project through the expanding member, the brake shoe heads 13, 14 are formed with recesses approximately corresponding to the width of pin 18, so that the ends of the pin are free to move upon rotation of the brake shaft without touching the brake shoe heads.

A bellows 21 is provided for sealing purposes between bearing 2 and expanding member 15. The expanding member may be shaped in the form of a cup, so that the front side opposite the brake lever is closed. If, however, the expanding member is formed with a through bore, this front side is closed by means of a cover 22, as shown in the drawing.

A centering and adjusting device is provided between the ends of the brake shoes opposite the brake shoe heads 13, 14. This device consists essentially of an adjusting nut 23 formed with right-hand and left-hand threads for two adjusting bolts 24 guided in the nut, of which each one bears against the corresponding brake shoe. The adjusting nut is mounted axially displaceable in a housing 25 fastened to the backing plate, and is surrounded by a pressure spring 26, the ends of which bear against sliding sleeves 27, which themselves contact abutments 28 of housing 25, respectively fixed rings 29 of the adjusting nut.

The pressure transmitting arms of the expanding member have the form of involute cams, so that the expanding member acts on the brake shoe heads through a leverage component of constant length during its whole working movement.

During braking the brake shaft is rotated in a manner known as such. The ends of pin 18 projecting into the bores 19, 20 of expanding member 15 engage the expanding member imparting movement to it, so that the brake shoes are being expanded. Due to the weaker spring 10, brake shoe 7 is first pressed against the brake drum. During this process the expanding member displaces itself radially on the ends of pin 18, in relation to the brake shaft. Upon further rotation of the brake shaft and of the expanding member, the latter slides in a reverse direction on the ends of pin 18, thus bringing the brake shoe 6 also in contact with the brake drum, against the action of spring 9. This movement coincides with a centering movement of the brake shoe system, due to the latter being in rotational engagement with the brake drum. Thereby the centering device becomes effective. Depending on the direction of rotation, the adjusting nut 23 is being moved in one direction or the other against the effect of spring 26. When the brake shaft returns to its original position under the effect of the return spring, the expanding member 15, the adjusting nut 23 and the two brake shoes move back into their original position.

The embodiment of the invention according to Figs. 3 and 4 distinguishes itself from the embodiment described above by the manner in which the expanding member is guided on the brake shaft. In this embodiment the expanding member 30 is formed with a slot 31 extending only over a part of its diameter, a tongue 32 of the brake lever 33 projecting into this slot and having sliding engagement therein. The length of the tongue is inferior to that of slot 31, so that on both ends there remains a space 34, permitting eccentric displacement of expanding member 30 in relation to brake lever 33.

In this embodiment the bellows 21 and the cover 22 are also provided for sealing purposes which permits effective lubrication of the brake shaft bearing as well as of the inner sliding surfaces of the expanding member.

Figure 6:
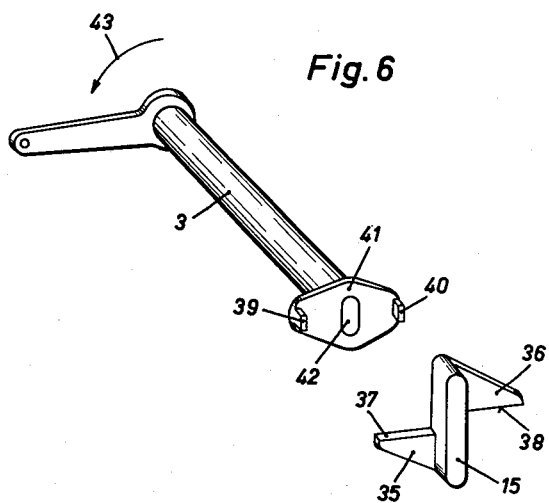
Fig. 6 shows two component parts of the mechanism in diagrammatic view and on a reduced scale.

Figs. 5 and 6 are illustrative of another improved construction of the expanding device, resulting in a further material reduction of friction losses. This construction further permits full utilisation of the bearing surfaces of the brake shoe heads. Said expanding member 15 is provided with two lever arms 35, 36 extending laterally towards the brake shoe heads 13, 14, and being axially retained by the latter. The lever arms are formed with bearing surfaces 37 and 38. With its surface 38 the lever arm bears against a driving dog 40, thereby supporting the expanding member, while the lever arm 35 engages under a driving dog 39. The form of the expanding member and its associated parts is shown diagrammatically in Fig. 6.

The driving dogs 39, 40 are provided on a flange 41, mounted on the tongue 42 of brake shaft 3. The brake shaft 3 is rotatably supported on backing plate 1.

The brake shoes 6, 7 are being acted upon by return springs, in a manner known as such, of which the spring 10 is weaker than the spring 9.

If the brake shaft 3 is being rotated in the direction of the arrow 43 (Fig. 6), the braking force is transmitted to the lever arms 35 and 36 via the driving dogs 39, 40. The spring 9 being stronger than the spring 10, brake shoe head 13 retains its position during forward drive. The expanding member bears against brake shoe head 13 at 44, forcing brake shoe head 14 outwardly at 45, until the brake shoe is applied against the drum and transmits the braking force to the other brake shoe in the direction of rotation of the drum.

When the brake is applied while driving in a reverse direction, brake shoe head 14 is first moved outwardly in the manner just described, until the brake shoe bears against the brake drum. However, the braking action now transmits the braking force via the expanding member to brake shoe head 13.

During the expanding action the driving dogs 39, 40 slide on the surfaces 37, 38. The arrangement is therefore thus, as to have these surfaces extend substantially parallel to the direction of the expanding force which facilitates displacement of lever arms 35, respectively 36 at the driving dogs 39, respectively 40.

The lever arms 35, respectively 36 form, together with the driving dogs 39, respectively 40, a driving coupling between the expanding member and the brake shaft. Thereby the lever arms and the driving dogs form radial and axial projections contacting each other. In the embodiment the lever arms are provided on the expanding member and the driving dogs on the brake shaft. The arrangement could, however, also be in an opposite sense.

It is to be understood, that the invention is not limited to the embodiments described, and that various modifications may be performed without departing from the principal object of the invention. For instance, in the embodiment according to Figs. 1 and 2, the pin 18 might be rigidly mounted in the expanding member instead of in the brake shaft.

We claim:

1. A brake, comprising, in combination, a backing plate; a drum arranged rotatably with respect to said backing plate; a plurality of brake shoes movably arranged within said drum between two end positions, said brake shoes frictionally engaging in one of said end positions thereof said drum, said brake shoes having end portions arranged in pairs opposite to one another; a brake shaft rotatably mounted in said backing plate; a floating expanding member radially guided in relation to said brake shaft and arranged between one of said pairs of opposite end portions of said brake shoes; and coupling means between said brake shaft and said expanding member, said coupling means including axial projections arranged on one of said brake shaft and said expanding member, and radial projections arranged on the other of said brake shaft and said expanding member, said axial projections engaging said radial projections, respectively, at points arranged diametrically on each side of said brake shaft when said brake shaft rotates in one direction with respect to said backing plate; a flange rigidly mounted on said brake shaft, said axial projections being formed on said flange, said radial projections being formed on said expanding member; and bearing members forming part of said radial projections, said bearing members extending substantially parallel to the direction of the force exerted during breaking on said expanding member, said bearing members being adapted to contact said axial projections.

2. A brake as claimed in claim 1, said bearing members being formed by plane surfaces of said radial projections.

3. A brake, comprising, in combination, a backing plate; a drum arranged rotatably with respect to said backing plate; a plurality of brake shoes movably arranged within said drum between two end positions, said brake shoes frictionally engaging in one of said end positions thereof said drum, said brake shoes having end portions arranged in pairs opposite to one another; a brake shaft rotatably mounted in said backing plate; a floating expanding member radially guided in relation to said brake shaft and arranged between one of said pairs of opposite end portions of said brake shoes; and coupling means between said brake shaft and said expanding member, said coupling means including axial projections arranged on said brake shaft and radial projections arranged on said expanding member; and bearing members forming part of said radial projections, said bearing members extending substantially parallel to the direction of the force exerted during braking on said expanding member, said bearing members being adapted to engage slidingly said axial projections.

4. A brake as claimed in claim 3, said bearing members being formed by plane surfaces of said radial projections.

5. A brake as claimed in claim 4, said plane surfaces of said radial projections extending at an angle to the expanding force, when said floating expanding member is inoperative.

6. A brake as claimed in claim 3, and a flange being rigid with said brake shaft, said axial projections being formed as projections of said flange.

References Cited in the file of this patent

UNITED STATES PATENTS

| Number | Name | Date |
|---|---|---|
| 920,643 | Pfander | May 4, 1909 |
| 1,727,923 | Andres | Sept. 10, 1929 |
| 1,750,611 | Blackmore | Mar. 11, 1930 |
| 2,006,397 | La Brie | July 2, 1935 |
| 2,064,103 | Burdick | Dec. 15, 1936 |
| 2,134,512 | Hall | Oct. 25, 1938 |
| 2,134,564 | Lauer | Oct. 25, 1938 |
| 2,160,055 | Brace | May 30, 1939 |
| 2,463,008 | White | Mar. 1, 1949 |